US012678982B2

(12) United States Patent
Watazu et al.

(10) Patent No.: US 12,678,982 B2
(45) Date of Patent: Jul. 14, 2026

(54) FINGER WITH TACTILE SENSOR FOR ROBOT HAND AND ROBOT HAND WITH TACTILE SENSOR USING SAME

(71) Applicant: NISSHA CO., LTD., Kyoto (JP)

(72) Inventors: Yuji Watazu, Kyoto (JP); Katsumi Tokuno, Kyoto (JP); Yuu Kuwataka, Kyoto (JP); Shingo Asaka, Kyoto (JP); Ayuko Tsuruoka, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 293 days.

(21) Appl. No.: 18/561,466

(22) PCT Filed: May 9, 2022

(86) PCT No.: PCT/JP2022/019646
§ 371 (c)(1),
(2) Date: Nov. 16, 2023

(87) PCT Pub. No.: WO2022/255031
PCT Pub. Date: Dec. 8, 2022

(65) Prior Publication Data
US 2024/0253252 A1      Aug. 1, 2024

(30) Foreign Application Priority Data

May 31, 2021      (JP) .................................. 2021-091608

(51) Int. Cl.
*B25J 19/02*          (2006.01)
*B25J 15/08*          (2006.01)
(Continued)

(52) U.S. Cl.
CPC ............... *B25J 19/02* (2013.01); *B25J 15/08* (2013.01); *G01L 1/142* (2013.01); *G01L 5/165* (2013.01); *G01L 5/226* (2013.01)

(58) Field of Classification Search
CPC .......... B25J 19/02; B25J 13/082; B25J 15/08; G01L 5/165; G01L 1/142; G01L 5/226
See application file for complete search history.

(56) References Cited

U.S. PATENT DOCUMENTS 4,555,953 A      12/1985  Dario et al.
6,438,257 B1      8/2002  Morimura et al.
(Continued)

FOREIGN PATENT DOCUMENTS

CN          121374729 A  *  1/2026
JP          H0645351 Y2  *  11/1994
(Continued)

OTHER PUBLICATIONS

International Search report PCT/JP2020/019646 dated Jul. 12, 2022 (pp. 1-3).

*Primary Examiner* — Octavia Hollington
(74) *Attorney, Agent, or Firm* — Millen, White, Zelano & Branigan, P.C.; Jennifer L. King

(57) ABSTRACT

A tactile sensor-attached finger is mountable on a robotic hand to reduce damage and failure caused by a grip target coming in contact with a part of a finger member other than its palm surface. A tactile sensor-attached finger (1F) for a robot hand for gripping a grip target includes a finger member (2) including a palm surface (21a) to be in contact with the grip target, a back surface (21b) opposite to the palm surface (21a), an end surface (21c) adjacent to the palm and back surfaces (21a, 21b) on ends of the palm and back surfaces (21a, 21b) in an extension direction in which the palm and back surfaces (21a, 21b) extend, and two side surfaces (21d) adjacent to the palm and back surfaces (21a, 21b) in a direction intersecting with the extension direction, and a tactile sensor (5) being a film attached to an outer surface of a housing (21) included in the finger member (2) and including a pressure-sensitive area (5a) overlapping the
(Continued)

palm surface (21*a*) and at least one of the end surface (21*c*), one of the two side surfaces (21*d*), or the other of the two side surfaces (21*d*).

18 Claims, 10 Drawing Sheets

(51) Int. Cl.

| | | |
|---|---|---|
| *G01L 1/14* | (2006.01) |
| *G01L 5/165* | (2020.01) |
| *G01L 5/22* | (2006.01) |

(56) References Cited

U.S. PATENT DOCUMENTS

| | | | |
|---|---|---|---|
| 6,538,410 B2 | 3/2003 | Mori et al. | |
| 8,451,011 B2 | 5/2013 | Hayakawa et al. | |
| 9,579,801 B2 * | 2/2017 | Wettels | ................ B25J 15/0028 |
| 9,914,212 B2 | 3/2018 | Wettels | |
| 10,874,307 B2 | 12/2020 | Narasimhan et al. | |
| 2011/0067504 A1 * | 3/2011 | Koyama | ................ G01V 11/00 |
| | | | 901/31 |
| 2022/0034728 A1 | 2/2022 | Katsuhara et al. | |
| 2025/0162177 A1 * | 5/2025 | Watazu | ................ B25J 9/1612 |

FOREIGN PATENT DOCUMENTS

| | | | | |
|---|---|---|---|---|
| JP | 2000065516 | A | | 3/2000 |
| JP | 2004330370 | A | | 11/2004 |
| JP | 2005207993 | A | | 8/2005 |
| JP | 2005349492 | A | * | 12/2005 |
| JP | 2013123773 | A | * | 6/2013 |
| JP | 2014142193 | A | | 8/2014 |
| JP | 2016528483 | A | | 9/2016 |
| JP | 2020055064 | A | * | 4/2020 |
| JP | 2020513919 | A | | 5/2020 |
| KR | 100278679 | B1 | | 1/2001 |
| WO | 2020080127 | A1 | | 4/2020 |

* cited by examiner

FIG. 3A
FIG. 3B
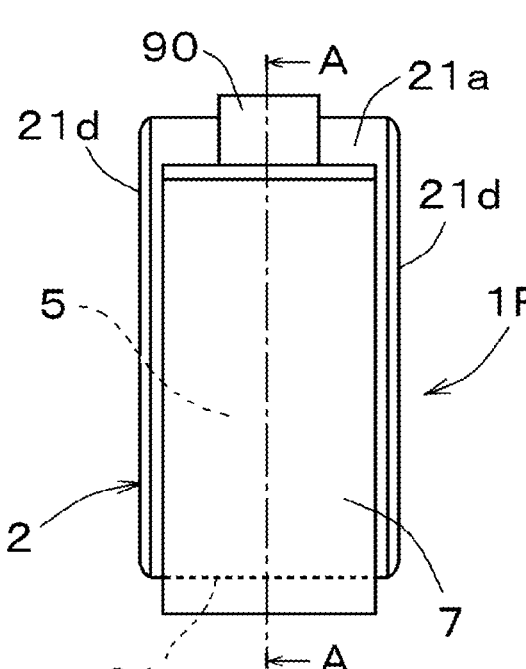
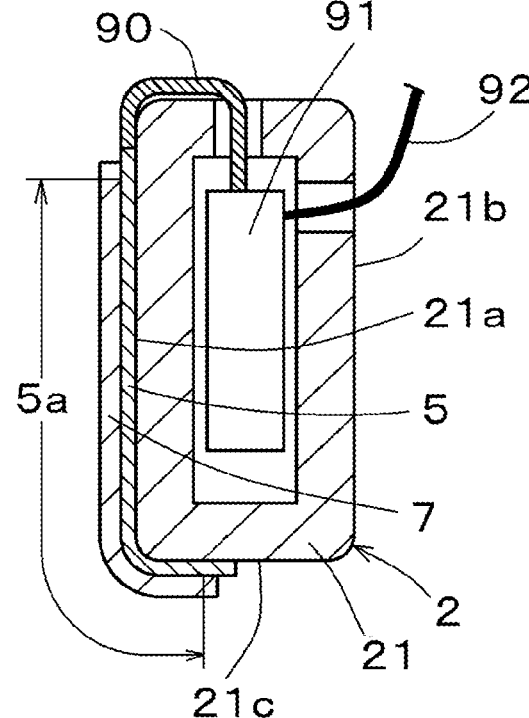
FIG. 4
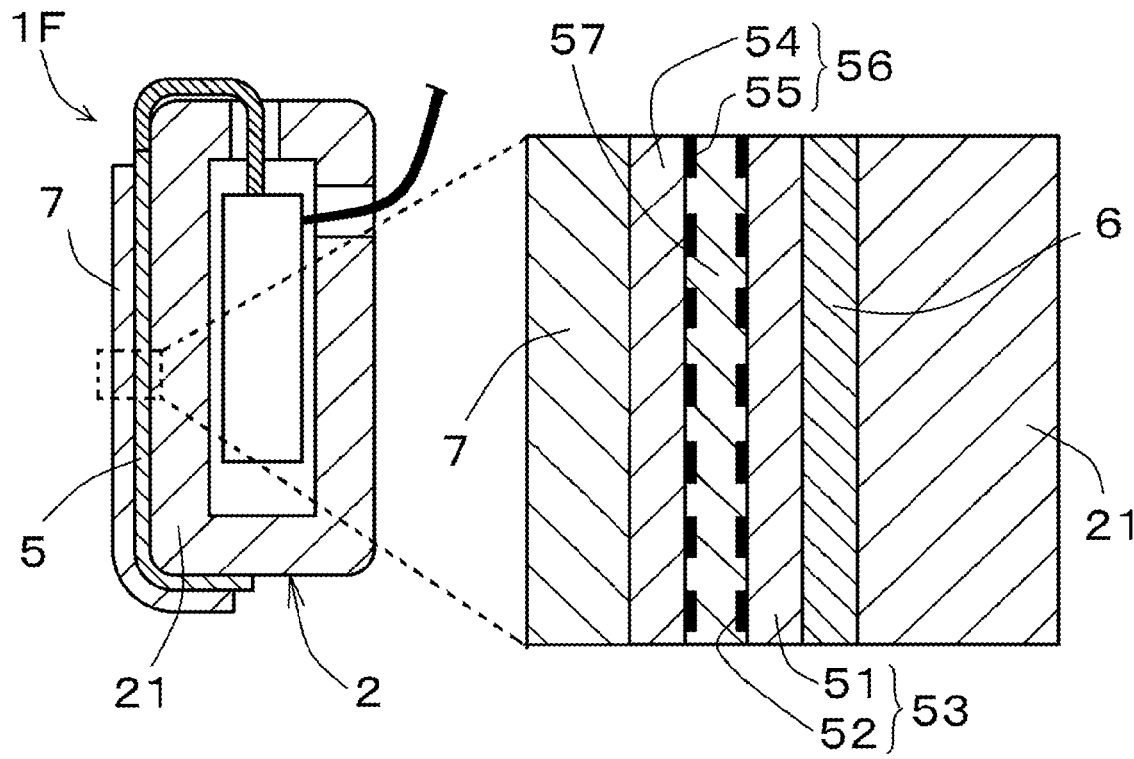

FIG. 7A
FIG. 7B
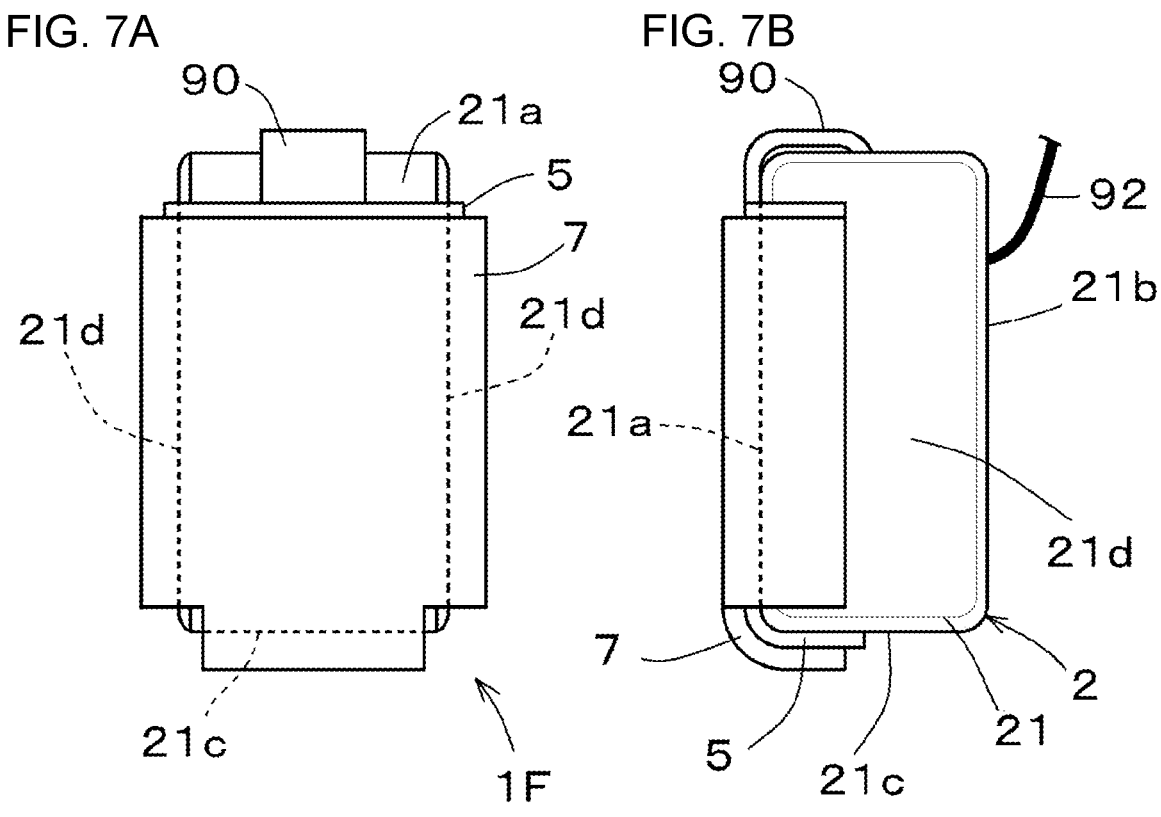
FIG. 8
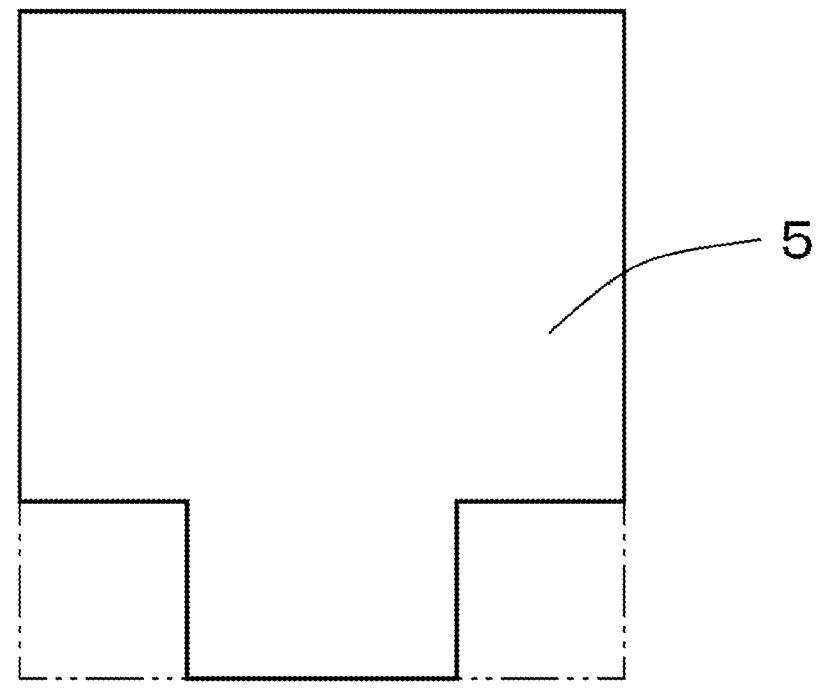

FIG. 9
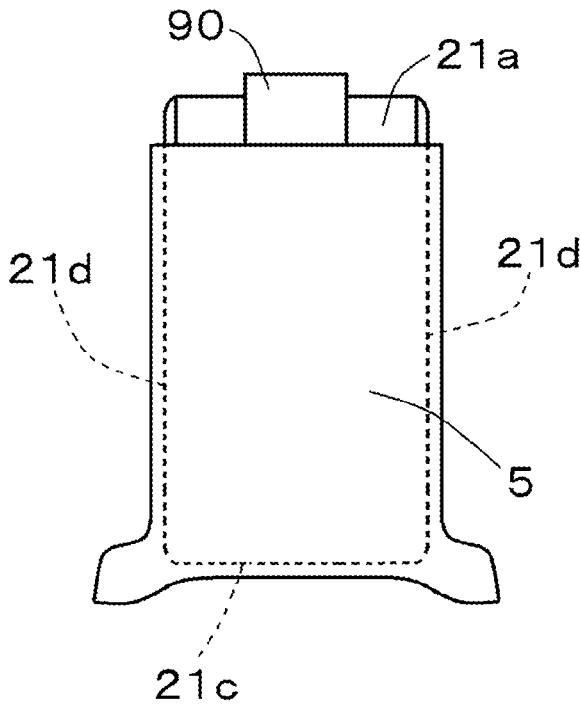
FIG. 10A                       FIG. 10B
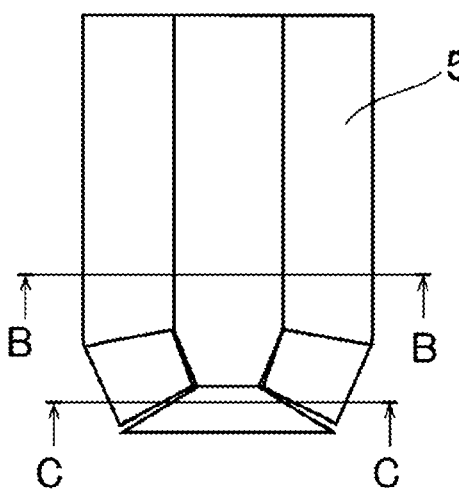
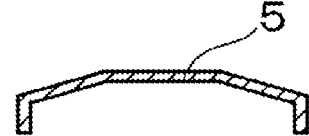
FIG. 10C
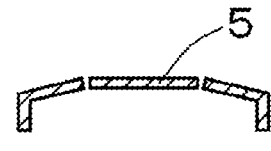

FIG. 11
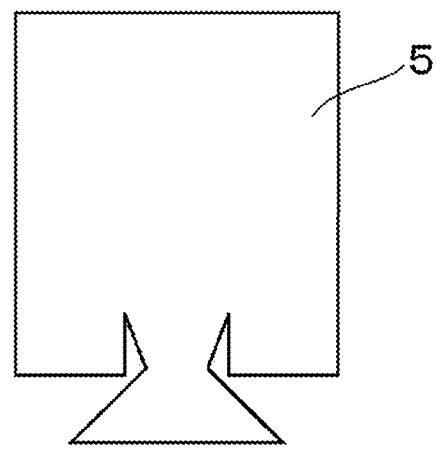
FIG. 12A                    FIG. 12B
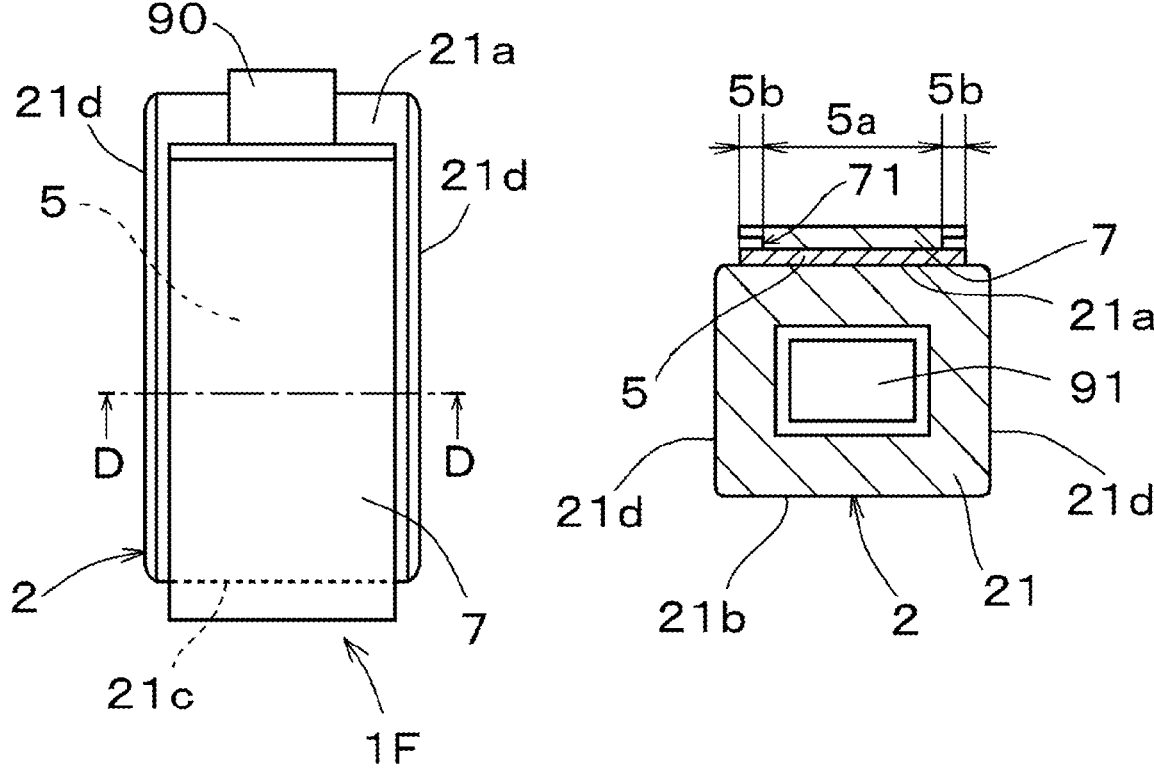

FIG. 13A
FIG. 13B
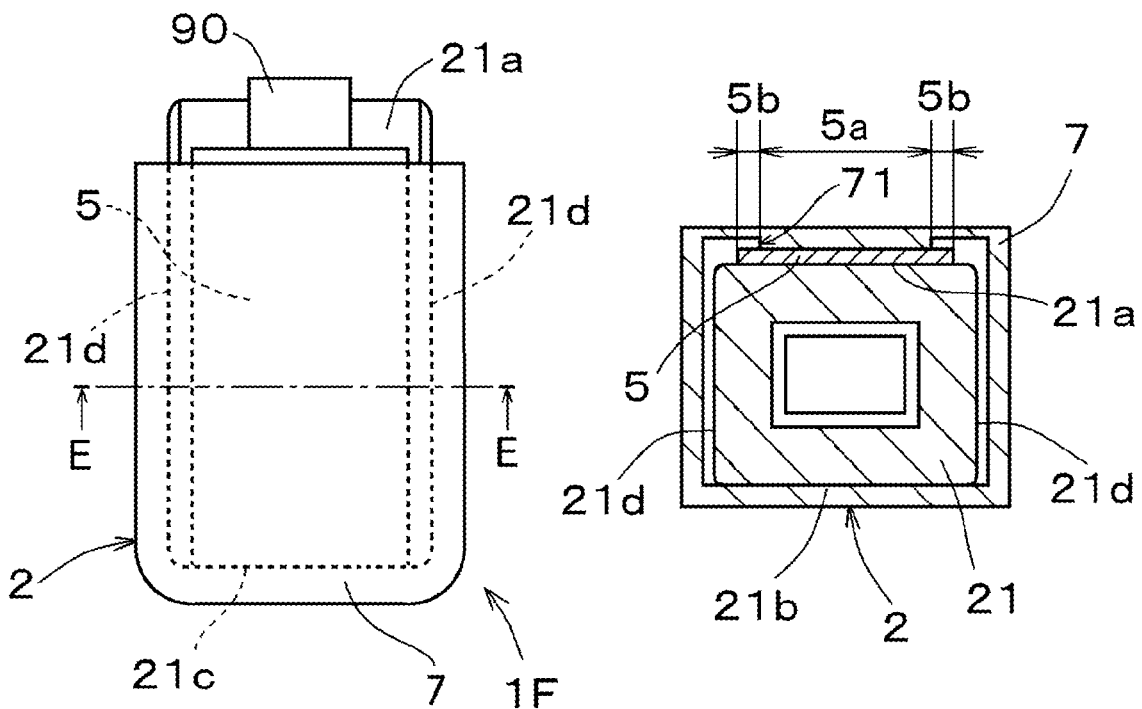
FIG. 14A
FIG. 14B
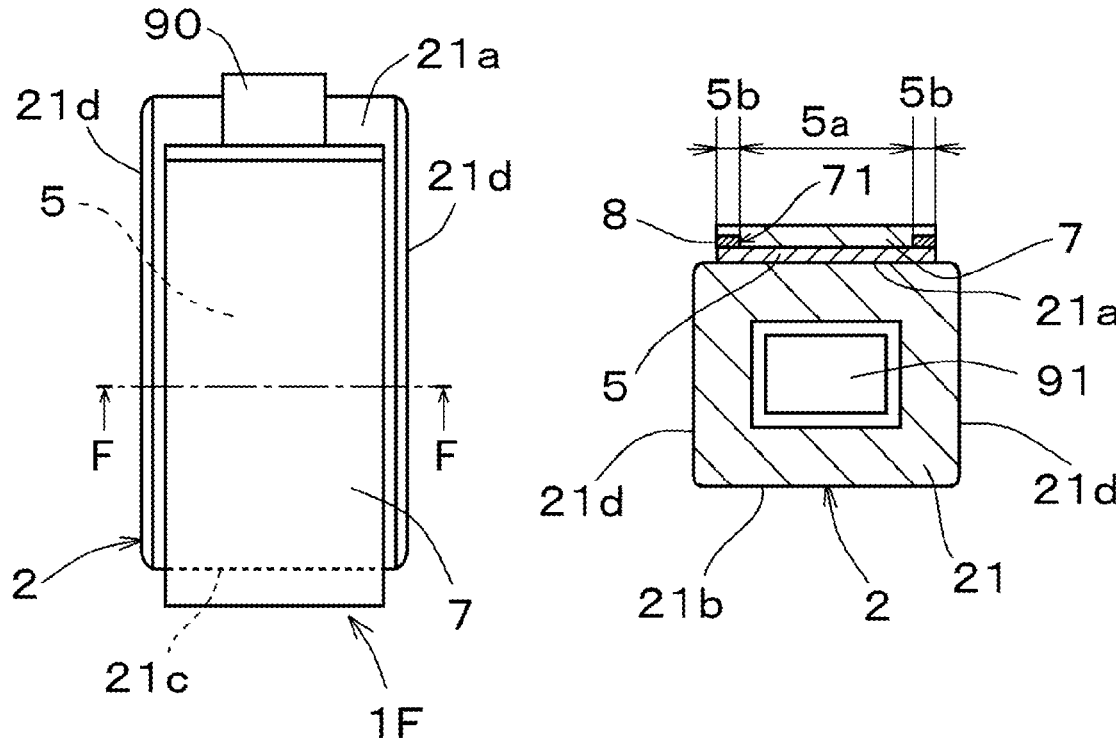

FIG. 15A
FIG. 15B
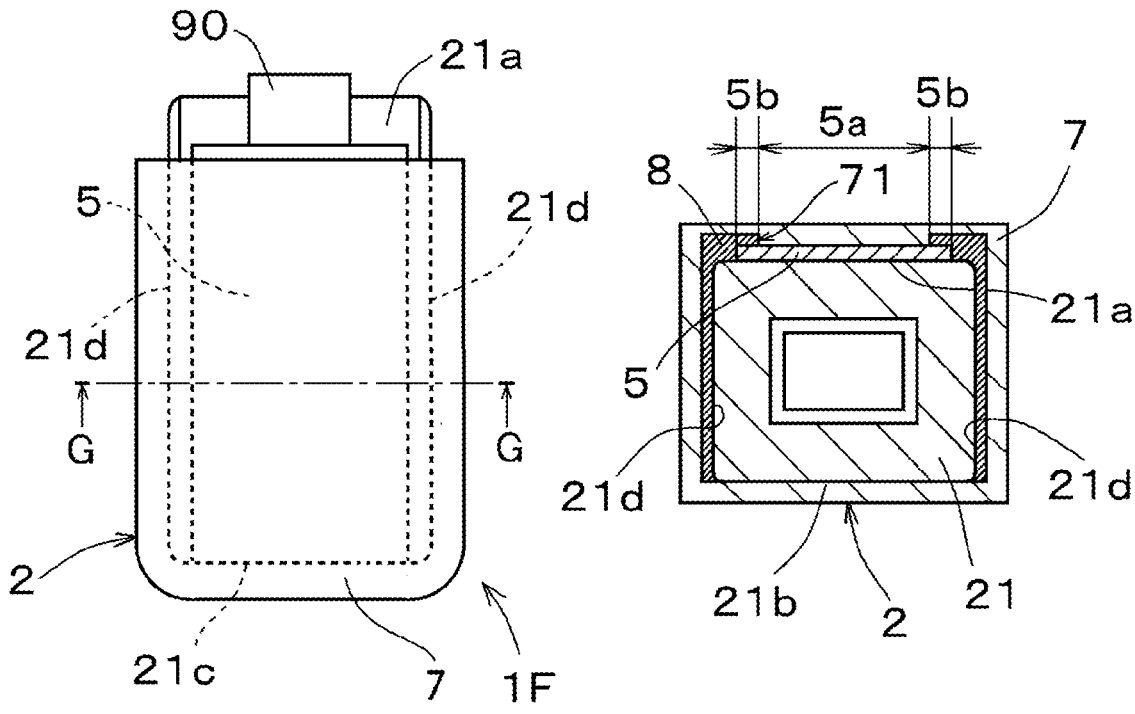
FIG. 16A
FIG. 16B
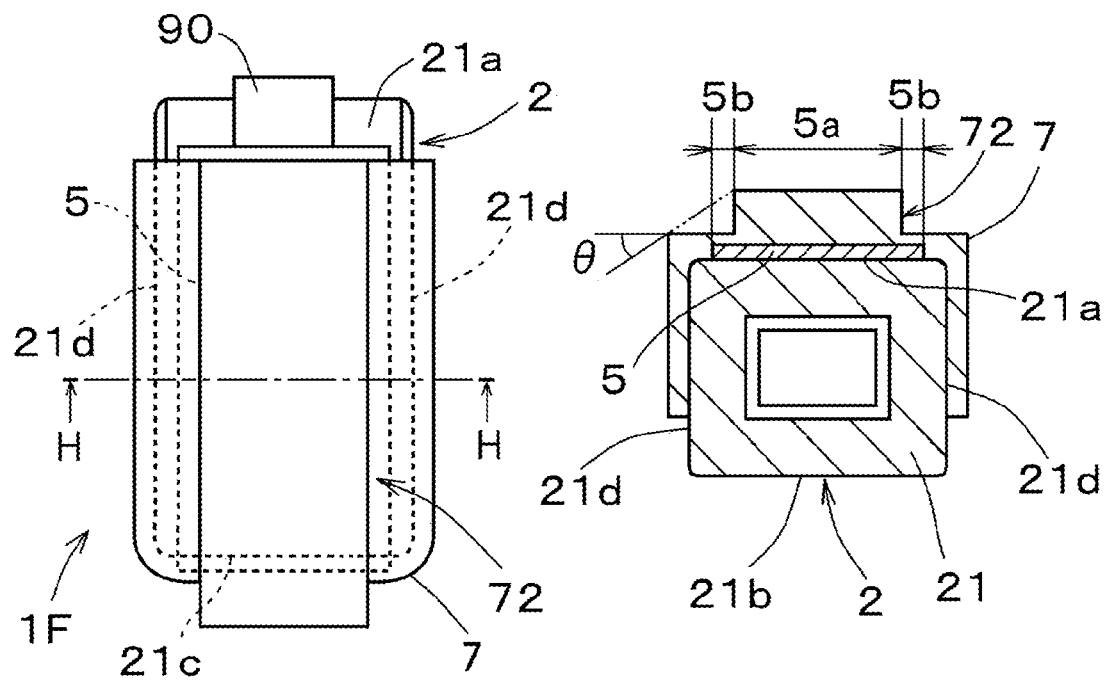

PRIOR ART

PRIOR ART

PRIOR ART

PRIOR ART

FINGER WITH TACTILE SENSOR FOR ROBOT HAND AND ROBOT HAND WITH TACTILE SENSOR USING SAME

TECHNICAL FIELD

The present invention relates to a tactile sensor-attached finger for a robotic hand that can reduce damage and failure caused by a grip target coming in contact with a part of a finger member other than its palm surface.

BACKGROUND

Robots are currently used in a wide range of fields such as service and healthcare industries in addition to the manufacturing industry. These robots often include a robotic hand to hold and carry various objects or to grip a tool for an operation.

The robotic hand has various contact states to be measured, such as, in addition to a gripping force, a shearing force generated on a palm surface of a finger member gripping a grip target. The minimum gripping force for the robotic hand to grip the grip target without dropping the grip target can be determined by, for example, detecting the shearing force from the grip target received by the robotic hand.

Patent Literature 1 describes a tactile sensor installed on a palm surface of a finger member of a robotic hand to measure three force components.

CITATION LIST

Patent Literature

Patent Literature 1: Japanese Unexamined Patent Application Publication No. 2008-281403

BRIEF SUMMARY

Technical Problem

However, the robotic hand illustrated in Patent Literature 1 includes two rectangular finger members, with one larger surface as the palm surface of the six surfaces of each rectangle alone including a pressure-sensitive area in the tactile sensor. This structure has issues.

For example, when a robotic hand 11 descends relative to a spherical grip target W placed at a predetermined position and the grip target W rolls and deviates from the predetermined position, the grip target W may come in contact with an end surface 21c of a finger member 2 (refer to FIGS. 18A and 18B). In this state, the robotic hand 11 cannot detect the contact between the end surface 21c of the finger member 2 and the grip target W. The robotic hand 11 thus continues descending to a position for gripping the grip target W, applying a greater load than intended between the robotic hand 11 and the grip target W. This causes damage to the grip target W or failure of the robotic hand 11.

In another example, when two finger members 2 of the robotic hand 11 approach, from both sides, the grip target W with a complex shape such as a tree branch, a side surface 21d of a finger member 2 may come in contact with the grip target W before a palm surface 21a of the finger member 2 comes in contact with the grip target W. (refer to FIGS. 19A to 19C). In this state, the robotic hand 11 cannot detect the contact between the side surface 21d of the finger member 2 and the grip target W. The two finger members 2 thus continues approaching the grip target W from both sides, applying a greater load than intended between the robotic hand 11 and the grip target W. This causes damage to the grip target W or failure of the robotic hand 11.

One or more aspects of the present invention are directed to a tactile sensor-attached finger for a robotic hand mountable on the robot hand to reduce damage and failure caused by a grip target coming in contact with a part of a finger member other than its palm surface.

Solution to Problem

In response to the above issue, aspects of the present invention are described below. Any of these aspects may be combined as appropriate.

A tactile sensor-attached finger for a robotic hand according to one or more aspects of the present invention is a finger of a robotic hand for gripping a grip target. The finger includes a finger member and a tactile sensor. The finger member includes a palm surface to be in contact with the grip target. The finger member also includes a back surface opposite to the palm surface. The finger member also includes an end surface adjacent to the palm surface and the back surface on ends of the palm surface and the back surface in an extension direction in which the palm surface and the back surface extend. The finger member also includes two side surfaces adjacent to the palm surface and the back surface in a direction intersecting with the extension direction of the palm surface and the back surface. The tactile sensor is a film attached to an outer surface of a housing included in the finger member. The tactile sensor includes a pressure-sensitive area overlapping the palm surface and at least one of the end surface, one of the two side surfaces, or the other of the two side surfaces.

The tactile sensor-attached finger for the robotic hand with this structure includes the tactile sensor with the pressure-sensitive area overlapping the end surface or the side surfaces of the finger member and can thus detect contact between the end surface or the side surfaces of the finger member and the grip target. This can reduce damage and failure caused by a grip target coming in contact with a part of the finger member other than its palm surface.

In one aspect, the tactile sensor may be a capacitive pressure-sensitive sensor including a first electrode film including a first base film with a first electrode pattern on the first base film, a second electrode film including a second base film facing the first base film with a second electrode pattern on the second base film, and an insulator between the first electrode film and the second electrode film.

The tactile sensor may be attached to the finger member with the first base film facing the finger member.

The tactile sensor with the above structure simply includes the thin-film patterned electrodes stacked across an insulator. The tactile sensor can thus perform intended detection when attached three-dimensionally along multiple outer surfaces of the housing included in the finger member.

In one aspect, the first base film and the second base film may have a relationship expressed as $E_1 \times t_1 > E_2 \times t_2$, where $E_1$ is a tensile elastic modulus of the first base film, $E_2$ is a tensile elastic modulus of the second base film, $t_1$ is a thickness of the first base film, and $t_2$ is a thickness of the second base film.

The above structure allows the first base film facing the finger member to be more rigid than the second base film facing outward. The film tactile sensor is thus less likely to change its dimension when attached three-dimensionally along the outer surfaces of the housing included in the finger member. This improves detection accuracy.

In one aspect, at least one of the palm surface, the end surface, one of the two side surfaces, or the other of the two side surfaces of the finger member may include a plurality of surfaces and overlap the pressure-sensitive area.

The above structure allows more surfaces to overlap the pressure-sensitive area, allowing measurement of various contact states with the grip target.

In one aspect, in a developed view, the tactile sensor may exclude a portion to deviate from the outer surface of the housing included in the finger member.

The film tactile sensor with the above structure does not include an excess portion that prevents bending and thus can easily be bent along the outer surface of the finger member.

In one aspect, the pressure-sensitive area in the tactile sensor may be divided into a plurality of areas based on a folded shape of the tactile sensor.

The pressure-sensitive area with the above structure is not continuously located on two or more surfaces, allowing accurate measurement of the direction of a three-dimensional vector of a force to be detected.

In one aspect, the finger may further include a protective layer covering the tactile sensor. The protective layer may include, in a portion adjacent to the tactile sensor, a cutout facing a pressure-insensitive area in the tactile sensor outward from the pressure-sensitive area.

The above structure includes, in the portion of the protective layer adjacent to the tactile sensor, the cutout facing the pressure-insensitive layer and thus allows the protective layer to greatly deform with the space in the cutout when the grip target and the finger member come in contact with each other outside the pressure-sensitive area. The deformation of the protective layer affects portions of the pressure-sensitive area near the pressure-insensitive area in the tactile sensor, allowing the detection of contact between the grip target and the finger member in the pressure-insensitive area.

In one aspect, the cutout may be filled with a cushion layer softer than the protective layer.

The above structure can minimize deterioration of durability of the tactile sensor caused by the cutout.

In one aspect, the protective layer may partially or fully cover a portion of the finger member to which the tactile sensor is unattached.

The above structure allows the protective area to be enlarged to protect the finger member in addition to the tactile sensor.

In one aspect, the tactile sensor may include the pressure-sensitive area overlapping the palm surface and the end surface. In this aspect, the finger may further include a protective layer continuously covering a full surface of the tactile sensor and a part or all of the two side surfaces of the finger member. The protective layer may include a protrusion facing the palm surface of the finger member and covering the pressure-sensitive area in the tactile sensor. The protrusion may protrude in a thickness direction more than a portion of the protective layer covering areas at or adjacent to boundaries between the palm surface and the two side surfaces of the finger member.

The above structure allows the protective area to be enlarged to protect the finger member in addition to the tactile sensor.

Additionally, with the protective layer protruding in the thickness direction in the portion facing the palm surface of the finger member and covering the pressure-sensitive area in the tactile sensor, the pressure-sensitive area can detect the grip target before the grip target comes in contact with a portion of the finger member at or adjacent to the boundaries between the palm surface and the side surfaces of the finger member.

The protective layer with the above structure is formed more easily than the protective layer with the cutout in the portion on the tactile sensor described above. The protective layer with the above structure may be formed by, for example, insert molding.

A robotic hand according to one or more aspects of the present invention includes a plurality of the tactile sensor-attached fingers according to any one of the above aspects, a support supporting basal ends of finger members in the plurality of tactile sensor-attached fingers, and a drive that drives the finger members to grip or release the grip target.

In one aspect, the finger members may be two finger members. The two finger members may include palm surfaces facing each other. Each of the two finger members may include no joint. The palm surfaces being parallel to each other may move closer to each other to grip the grip target.

Advantageous Effects

The tactile sensor-attached finger for the robotic hand according to the above aspects of the present invention is mountable on the robotic hand to reduce damage and failure caused by a grip target coming in contact with a part of the finger member other than its palm surface.

BRIEF DESCRIPTION OF DRAWINGS

FIGS. 3A and 3B are diagrams of an example tactile sensor-attached finger for a robotic hand according to the first embodiment.

FIG. 4 is a diagram of a tactile sensor with an example structure attached to a finger member in the first embodiment.

FIGS. 7A and 7B are diagrams of still another example of the tactile sensor-attached finger according to the first embodiment.

FIG. 8 is a deployment view of a tactile sensor used in the modification in FIGS. 7A and 7B.

FIG. 9 is a diagram of a rectangular tactile sensor attached to an end surface and two side surfaces of the finger member.

FIGS. 10A to 10C are diagrams of an example tactile sensor attached to a finger member with multiple palm surfaces.

FIG. 11 is a development view of the tactile sensor shown in FIGS. 10A to 10C.

FIGS. 12A and 12B are diagrams of the tactile sensor-attached finger according to the first embodiment, showing an example shape of a protective layer.

FIGS. 13A and 13B are diagrams of a tactile sensor-attached finger for a robotic hand according to a second embodiment, showing an example shape of a protective layer.

FIGS. 14A and 14B are diagrams of a tactile sensor-attached finger for a robotic hand according to a third embodiment, showing an example shape of a protective layer.

FIGS. 15A and 15B are diagrams of the tactile sensor-attached finger according to the third embodiment, showing another example shape of a protective layer.

FIGS. 16A and 16B are diagrams of a tactile sensor-attached finger for a robotic hand according to a fourth embodiment, showing an example shape of a protective layer.

DETAILED DESCRIPTION

A robotic hand including tactile sensor-attached fingers according to one or more embodiments of the present invention will be described below with reference to the drawings.

First Embodiment

Figure 1:
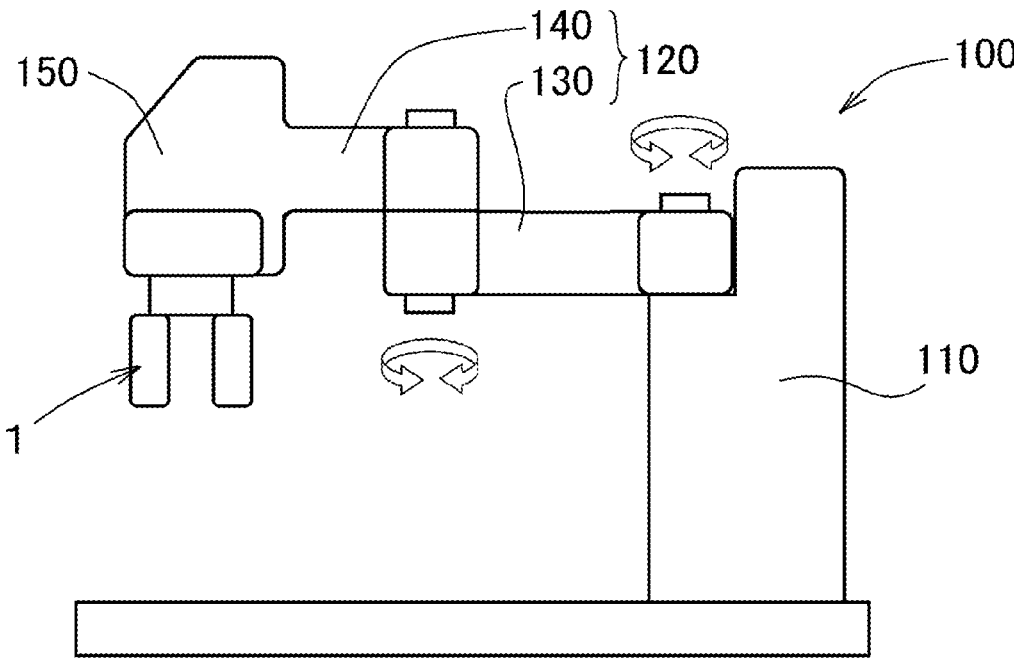
FIG. 1 is a diagram of an example robot with a robotic hand including tactile sensor-attached fingers according to a first embodiment.

FIG. 1 is a side view of a robot 100 including a robotic hand 1 including tactile sensor-attached fingers according to a first embodiment of the present invention.

(1) Robot

As shown in FIG. 1, the robot 100 is a selective compliance assembly robot arm (SCARA) robot and includes a support base 110 and an arm 120 connected to the support base 110 in a pivotable manner. The arm 120 includes a first arm 130 connected to the support base 110 with a joint in a manner pivotable about a vertical axis, a second arm 140 connected to the first arm 130 with a joint in a manner pivotable about a vertical axis, and a work head 150 at the distal end of the second arm 140. The robotic hand 1 including the tactile sensor-attached fingers is attached to the lower end of the work head 150. The work head 150 can cause the robotic hand 1 to pivot about a vertical axis and can ascend and descend in a vertical direction.

(2) Robotic Hand 1

The robotic hand 1 will be described in detail below.

Figure 2:
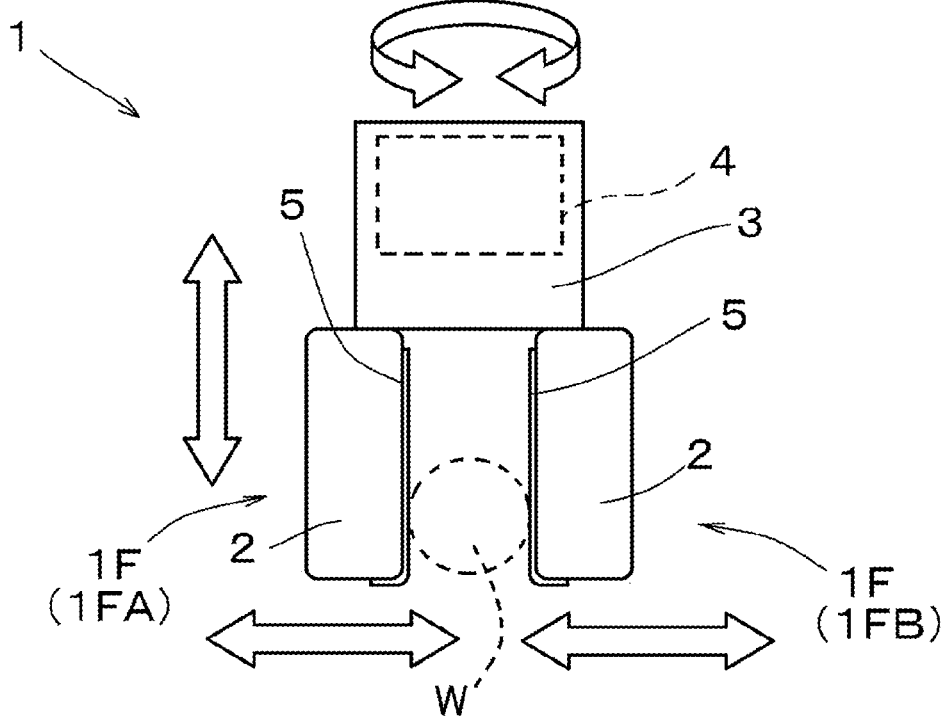
FIG. 2 is a diagram of an example robotic hand including the tactile sensor-attached fingers according to the first embodiment.

As shown in FIG. 2, the robotic hand 1 according to the present embodiment includes two tactile sensor-attached fingers 1F. Each tactile sensor-attached finger 1F includes a finger member 2 and a tactile sensor 5 attached to outer surfaces of a housing 21 included in the finger member 2. The robotic hand 1 also includes a support 3 supporting the basal ends of the two finger members 2 and a drive 4 for driving the finger members 2. The drive 4 can move the two finger members 2 toward and away from each other. This allows the robotic hand 1 to grip a grip target W or release the gripped grip target W. The entire robotic hand 1 can move vertically or rotate as appropriate.

The grip target W may be any object, such as an industrial product or a farm product, an object with any size and shape, or an object with an undefined shape.

(3) Finger Member 2

FIGS. 3A and 3B are diagrams of an example of the tactile sensor-attached finger 1 for the robotic hand 1 according to the first embodiment. FIG. 3A is a diagram of the tactile sensor-attached finger 1F showing a palm surface 21a of each finger member 2. FIG. 3B is a sectional view taken along line AA in FIG. 3A.

Each finger member 2 includes the substantially rectangular housing 21 including the palm surface 21a to be in contact with the grip target W (to grip the grip target W for the robotic hand), a back surface 21b opposite to the palm surface 21a, an end surface 21c adjacent to the palm surface 21a and the back surface 21b at their ends in X-direction in which the palm surface 21a and the back surface 21b extend, and two side surfaces 21d adjacent to the palm surface 21a and the back surface 21b in Y-direction intersecting with X-direction in which the palm surface 21a and the back surface 21b extend. The housing 21 is formed from a resin or a metal.

Each finger member 2 includes no joint in the examples shown in FIGS. 2 to 3B. The tactile sensor-attached finger 1F thus grips the grip target W with the palm surfaces 21a parallel to each other moving closer to each other.

(4) Tactile Sensor 5

As shown in FIGS. 3A and 3B, the tactile sensor 5 is a film attached to the outer surfaces of the housing 21 included in the finger member 2. In the example shown in FIGS. 3A and 3B, the tactile sensor 5 includes a pressure-sensitive area 5a overlapping the palm surface 21a and the end surface 21c of the finger member 2.

The tactile sensor 5 is a three-axis force sensor that detects a pressing force (pressure) and a sliding force (friction force) in the pressure-sensitive area 5a. The tactile sensor 5 mounted on each finger member 2 in the robotic hand 1 can measure, in addition to the magnitude of a force for gripping the grip target W, the magnitudes of forces for operations such as twisting, pressing, and pulling.

FIG. 4 is a diagram of the tactile sensor 5 with an example structure attached to the finger member 2 in the first embodiment. FIG. 4 shows, in an enlarged manner, a portion of the finger member 2 with the tactile sensor 5 attached indicated by the dashed line.

As shown in FIG. 4, the tactile sensor 5 may be, for example, a capacitive pressure-sensitive sensor including a first electrode film 53 including a first electrode 52 on a first base film 51, a second electrode film 56 including a second electrode 55 on a second base film 54 facing the first base film 51, and an insulator 57 between the first electrode film 53 and the second electrode film 54.

The pressure-sensitive area 5a can detect forces with the first electrode 52 and the second electrodes 55. The tactile sensor 5 also includes a pressure-insensitive area 5b including wiring patterns connected to the first electrode 52 and the second electrode 55 outward from the pressure-sensitive area 5a.

This capacitive pressure-sensitive sensor is attached to the finger member 2 with an adhesive layer 6, with the first base film 51 facing the finger member 2.

The tactile sensor 5 simply including the thin-film patterned electrodes stacked each other across the insulator can perform intended detection when attached three-dimensionally along multiple outer surfaces of the housing included in the finger member 2.

Examples of the material for the first base film 51 and the second base film 54 include rubber sheets formed from, for example, urethane, epoxy, or silicone, and a film of a synthetic resin such as polyethylene terephthalate (PET), polycarbonate (PC), and polyimide (PI).

The first base film 51 and the second base film 54 each have a thickness of 0.03 μm to 0.5 mm. The thin flexible films with a total thickness of 1 mm or less used as bases allow smooth mounting on the surfaces of the finger member 2 in the robotic hand 1.

The relationship between the first base film 51 and the second base film 54 may be $E_1 \times t_1 > E_2 \times t_2$, where $E_1$ is the tensile elastic modulus of the first base film 51, $E_2$ is the tensile elastic modulus of the second base film 54, $t_1$ is the thickness of the first base film 51, and $t_2$ is the thickness of the second base film 54.

The above relationship allows the first base film 51 facing the finger member 2 to be more rigid than the second base film 54 facing outward. The film tactile sensor 5 is thus less likely to change its dimension when attached three-dimensionally along the outer surfaces of the housing 21 included in the finger member 2. This improves detection accuracy.

The tensile elastic modulus herein refers to a value obtained by dividing the tensile stress received by the first base film 51 or the second base film 54 by the strain generated in the first base film 51 or the second base film 54 in a tensile test performed, using noncontact extensometer capable of measuring minute displacement, in accordance with JIS K7127 and JIS K7161 on the first base film 51 or the second base film 54 cut into the shapes of the type-1 dumbbell specimen.

The first electrode 52 and the second electrode 55 in the capacitive pressure-sensitive sensor may each be in the example patterns described below or in a known pattern.
Pattern 1

The first electrode 52 and the second electrode 55 are each in a linear pattern. The linear patterns extend in the same direction in a plan view (not shown). When the first electrode 52 and the second electrode 55 are in the linear patterns extending in the same direction, in response to a force applied from a direction intersecting with an extension direction of the second electrode 55, the second electrode 55 deforms based on the magnitude of the force, changing the distance to the first electrode 52. This allows measurement of the magnitude of the force through detection of an electrical signal during the change in capacitance between the first electrode 52 and the second electrode 55.

For example, three (or left, middle, and right) first electrodes 52 form a linear pattern extending in a direction, and two (or left and right) second electrodes 55 form a linear pattern extending in the same direction as the first electrodes 52. One of the two second electrodes 55 is located between the left first electrode 52 and the middle first electrode 52, and the other is located between the middle first electrode 52 and the right first electrode 52. In this structure, in response to a force applied from left to right in the direction intersecting with the extension direction of the second electrodes 55, the two second electrodes 55 in the linear pattern deform (translate) in the direction in which the force is applied based on the magnitude of the force, with the left second electrode 55 being closer to the middle first electrode 52 and the right second electrode 55 being farther from the middle the first electrode 52. This also causes the left second electrode 55 to be farther from the left first electrode 52 and the right second electrode 55 to be closer to the right first electrode 52. These changes in the distances between the layers of the linear patterns are proportional to the magnitude of the applied force.

In other words, a shearing force acting on a surface of the tactile sensor 5 increases or decreases areas in which multiple capacitors formed with the first electrodes 52 and the second electrodes 55 facing and overlapping one another, changing the ratios of capacitances. The changes in the multiple capacitances can thus be measured to detect a pressing force and the shearing force.

The magnitude of the applied force can thus be detected by detecting the changes in the capacitances between the linear patterns resulting from the changes in distances between the layers of the linear patterns.

In this example, three first electrodes 52 form a linear pattern and two second electrodes 55 form a linear pattern, but one electrode or four or more electrodes may form a linear pattern. The number of first electrodes 52 may be the same as the number of second electrodes 55 in the linear patterns.

The linear pattern including the first electrodes 52 or the linear pattern including the second electrodes 55 may be substantially the same elongated rectangles, have different widths and lengths, or have partially wider or narrower shapes.

The linear patterns may be polygonal or curvy as in, for example, an arc, rather than rectangular. The linear patterns may have shapes combining the shapes described above or be wavy. These shapes including a square and a circle are typically not described as linear patterns. However, the linear pattern herein includes any shape that achieves the effects and functions provided by the structure in one or more embodiments of the present invention.

In pattern 1, the linear pattern including the first electrodes 52 and the linear pattern including the second electrodes 55 extend in the same direction. When a force (pressing force) is applied to the surface of the tactile sensor 5 in the normal direction, the first electrodes 52 and the second electrodes 55 move closer to one another, increasing the capacitances of the multiple capacitors including the first electrodes 52 and the second electrodes 55 facing and overlapping one another. These changes in the capacitances can be measured to measure the magnitude of the pressing force.
Pattern 2

The first electrode 52 may include two layers including a lower first electrode and an upper first electrode across an insulator (not shown). The second electrode 55 may include two layers including a lower second electrode and an upper second electrode across an insulator (not shown). In this case, the first electrode 52 may include a linear pattern including the lower first electrode extending in X-direction and a linear pattern including the upper first electrode extending in Y-direction. The second electrode 55 may include a linear pattern including the lower second electrode extending in the same X-direction as the lower first electrode and a linear pattern including the upper second electrode extending in the same Y-direction as the upper first electrode.

The two layers included in the second electrode 55 may be on the two layers included in the first electrode 52 or may alternate with the layers in the second electrode 55.

This structure allows separate detection of a change in the ratio of capacitance between the lower first electrode and the lower second electrode extending in X-direction and a change in the ratio of capacitance between the upper first electrode and the upper second electrode extending in Y-direction.

Thus, when the shearing force is applied obliquely in a plan view with a force component in X-direction and a force component in Y-direction (when the direction of the shearing force is not parallel or perpendicular to the direction of either the linear pattern including the upper first electrode or the linear pattern including the upper second electrode), the force component in X-direction and the force component in Y-direction can be measured separately.

In pattern 2, the two-layer first electrode 52 includes the lower first electrode and the upper first electrode across the insulator, and the two-layer second electrode 55 includes the lower second electrode and the upper second electrode across the insulator. In response to a force (pressing force) in the normal direction applied to a surface of the tactile sensor 5, the lower first electrode and the lower second electrode move closer to each other, and the upper first electrode and the upper second electrode move closer to each other. This increases the capacitances of multiple capacitors including the lower first electrode and the lower second electrode facing and overlapping each other and including the upper first electrode and the upper second electrode facing and overlapping each other. These changes in the capacitances can be measured to measure the magnitude of the pressing force.

Pattern 3

Multiple capacitive pressure-sensitive sensors such as those described in pattern 1 may be arranged in a matrix as a capacitive pressure-sensitive sensor group. This allows measurement of the plane distribution of a force in directions each intersecting with a direction of each capacitive pressure-sensitive sensor. In other words, each capacitive pressure-sensitive sensor can measure, at its position, the force in the direction intersecting with the capacitive pressure-sensitive sensor. Thus, the multiple capacitive pressure-sensitive sensors arranged in a matrix can each measure the magnitude of the force at its position when the magnitude of the force varies among positions.

In this case, each capacitive pressure-sensitive sensor includes the same first base film 51 and the same second base film 54, on which the second electrode 55 and the first electrode 52 are formed separately.

Pattern 4

Multiple capacitive pressure-sensitive sensors each including multiple layers of second electrodes 55 and first electrode 52 such as those in pattern 2 described above may be arranged in a matrix as a capacitive pressure-sensor group. This allows, for a force applied to each capacitive pressure-sensitive sensor, the measurement of force components in X-direction and Y-direction and the plane distribution of the force components in X-direction and Y-direction. In other words, each capacitive pressure-sensitive sensor can measure, at its position, the force components (in X-direction and Y-direction) in the direction intersecting with the capacitive pressure-sensitive sensor. Thus, the multiple capacitive pressure-sensitive sensors arranged in a matrix can each measure the magnitude of the force components (in X-direction and Y-direction) at its position when the magnitude and direction of the force vary among positions.

In this case, as with pattern 3, each capacitive pressure-sensitive sensor includes the same first base film 51 and the same second base film 54, on which the second electrode 55 and the first electrode 52 are formed separately.

The sensor in pattern 3 or 4 can measure plane distributions and are thus particularly applicable to a robotic hand.

In patterns 3 and 4, the capacitive pressure-sensitive sensors are arranged in a matrix, but may be arranged in a row for elongated narrow finger member 2.

Pattern 5

The first electrode 52 is in an island pattern, whereas the second electrode 55 includes upper second electrodes and lower second electrodes as two layers across an insulator. The upper second electrodes and the lower second electrodes intersect with one another to form linear patterns in a plan view. A part of the island pattern including the first electrode 52 overlaps a part of the upper second electrode pattern and a part of the lower second electrode pattern in a plan view. In this plan view, the upper second electrodes and the lower second electrodes may intersect with one another at any angle. When the upper second electrodes and the lower second electrodes are orthogonal to one another (or intersect with one another at 90°), the pattern including the first electrode 52 is a rectangular grid. When the upper second electrodes and the lower second electrodes are not orthogonal to one another, the pattern including the first electrode 52 is a parallelogrammatic grid.

The change in capacitance between the first electrode 52 in the island pattern and the upper second electrodes and the change in capacitance between the first electrode 52 in the island pattern and the lower second electrodes are measured to measure a force component in X-direction of the force in the direction of the upper second electrode pattern and the force component in Y-direction of the force in the direction of the lower second electrode pattern.

In response to a force component in X-direction applied in this state, the upper second electrodes translate in proportion to the magnitude of the force, increasing the area in which the capacitance between the first electrode 52 and the upper second electrodes can be detected. Thus, the increased capacitance can be detected to measure the force component before the translation in X-direction.

Similarly, in response to a force component in Y-direction applied, the lower second electrodes translate in proportion to the magnitude of the force, increasing the area in which the capacitance between the first electrode 52 and the lower second electrodes can be detected. Thus, an increased capacitance can be detected to measure the force component before the translation in Y-direction.

In pattern 5, in response to a force (pressing force) applied to a surface of the tactile sensor 5 in the normal direction, the upper second electrodes and the lower second electrodes move closer to one another, increasing the capacitances of the multiple capacitors including the upper second electrodes and the lower second electrodes facing and overlapping one another. These changes in the capacitances can be measured to measure the magnitude of the pressing force.

Example patterns of the first electrode 52 and the second electrode 55 are not limited to those described above.

Examples of the material for the first electrode 52 and the second electrode 55 include (1) films of a metal such as gold, silver, copper, platinum, palladium, aluminum, or rhodium, (2) conductive paste films with a resin binder in which particles of such metals are dispersed, and an organic semiconductors such as polyhexylthiophene, polydioctylfluorene, pentacene, or tetrabenzoporphyrin, but are not limited to these.

Examples of the method for forming the first electrode 52 and the second electrode 55 include, in an example using (1) described above, forming a conductive film on their entire surfaces by, for example, plating, sputtering, vacuum evaporation, or ion plating, and then patterning by etching, and, in an example using (2) described above, directly forming the patterns with a printing method such as screen printing, gravure printing, or offset printing.

Examples of the material for the insulator 57 include rubber sheets and foam materials formed from, for example, urethane, silicone, epoxy, ethylene vinyl acetate copolymer, polyethylene, polypropylene, polystyrene, or butadiene. These materials may be bonded to the first electrode film 53 and the second electrode film 55 with an elastic adhesive, or in other words, an adhesive that remains elastic after curing.

In some embodiments, the insulator 57 may be a coating layer formed by printing or coating, rather than a sheet formed with a known sheet forming method such as extrusion molding.

The pressure-insensitive area 5b located outward from the pressure-sensitive area 5a in the tactile sensor 5 includes wiring patterns extending from the first electrode 52 and the second electrode 55. As shown in FIG. 3B, these wiring patterns are pulled out of the tactile sensor 5 with a film connector 90 and electrically connected to a printed circuit board (PCB) 91 housed inside the housing 21 included in the finger member 2 in the robotic hand 1. Signals processed by the PCB 91 are transmitted from the PCB 91 to the robot with a cable 92 such as a universal serial bus (USB) cable.

(5) Adhesive Layer 6

As shown in FIG. 4, the tactile sensor 5 is attached to the finger member 2 in the robotic hand 1 with the adhesive layer 6.

Examples of the material for the adhesive layer 6 include double-sided tape.

(6) Protective Layer 7

As shown in FIG. 4, the tactile sensor 5 is covered with a protective layer 7.

The protective layer 7 protects the pressure-sensitive area 5a in the tactile sensor 5 to which a force is applied. The protective layer 7 has its upper surface as a contact surface with the grip target W.

FIG. 12B is a sectional view of the tactile sensor-attached finger F1 for the robotic hand 1 according to the first embodiment, showing an example shape of the protective layer 7. FIG. 12A is a diagram of the finger member 2 showing the palm surface 21a. FIG. 12B is a sectional view taken along line DD in FIG. 12A.

The protective layer 7 covers the tactile sensor 5 as shown in FIG. 12B and includes, in portions of the protective layer 7 adjacent to the tactile sensor 5, cutouts 71 facing the pressure-insensitive area 5b located outward from the pressure-sensitive area 5a in the tactile sensor 5. The cutouts 71 are empty spaces serving as air layers.

When the grip target W and the finger member 2 come in contact with each other in the pressure-insensitive area 5b, the protective layer 7 greatly deforms with the spaces defined by the cutouts 71. The deformation of the protective layer 7 affects portions of the pressure-sensitive area 5a near the pressure-insensitive area 5b in the tactile sensor 5, allowing the detection of contact between the grip target W and the finger member 2.

The cutouts 71 shown in the figure each include a surface of the protective layer 7 in contact with the space defined by the lower surface parallel to a surface of the housing 21 included in the finger member 2 and a side surface perpendicular to the surface of the housing 21, but may have another structure. For example, the lower surface may be inclined with respect to the surface of the housing 21 included in the finger member 2. The lower surface may be inclined with respect to the surface of the housing 21 included in the finger member 2 to eliminate the side surface. The surface of the protective layer 7 in contact with the space may be curved.

Examples of the material for the protective layer 7 include rubber sheets and foam materials formed from, for example, urethane, silicone, epoxy, ethylene vinyl acetate copolymer, polyethylene, polypropylene, polystyrene, or butadiene. Such a rubber sheet or a foam material is attached to and cover the tactile sensor 5 as the protective layer 7. The protective layer 7 may be formed by insert molding by placing the housing 21 with the tactile sensor 5 attached in a mold and pouring, for example, liquid rubber into the mold. The protective layer 7 may have a thickness of 0.5 to 5 mm.

Various design sheets may be attached to the surface of the protective layer 7. Other sheets such as leather sheets and fabric sheets, in addition to design sheets, may be attached to the protective layer 7 as appropriate to add a design. The protective layer 7 may have a design on its surface.

Figure 5:
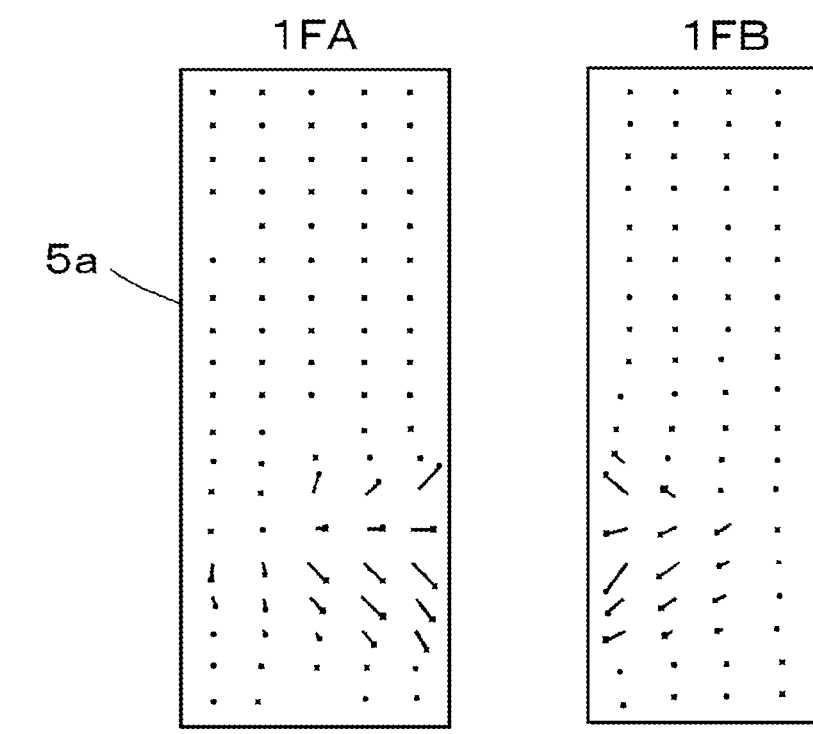
FIG. 5 is a diagram of an example distribution of a shearing force detected by tactile sensors.

FIG. 5 is a diagram of an example distribution of the shearing force detected by the tactile sensors 5 when the grip target W is gripped as shown in FIG. 2. The two tactile sensor-attached fingers 1F include a tactile sensor-attached finger 1FA and a tactile sensor-attached finger 1FB. The shearing force on the palm surfaces 21a of the finger members 2 gripping the grip target W was measured with the tactile sensors 5 included in the fingers 1FA and 1FB. The distribution of the shearing force is shown on pressure-sensitive surfaces. The electrodes are each in pattern 5 described above, and the grip target W is a cylindrical object.

The detected distribution of the shearing force shows that the grip target W is pulled in the direction into the page of FIG. 2.

(7-1) First Modification

In the first embodiment described above, the robot 100 with the robotic hand 1 attached at its distal end is a SCARA robot, but may be another robot. For example, the robot 100 may be a vertical articulated robot.

(7-2) Second Modification

In the first embodiment described above, the finger member 2 in the robotic hand 1 includes no joint, but may include one or more joints. For example, each finger member 2 may include one joint or two joints.

The finger member 2 including joints can come in contact with the grip target W at various angles in portions of the finger member 2 other than the palm surface 21a more frequently. Tactile sensors are thus to be included in those contact surfaces.

(7-3) Third Modification

In the first embodiment described above, the robotic hand 1 includes two finger members 2, but may include one finger member 2 or three or more finger members 2. For example, the robotic hand 1 may include multiple finger members 2 such as three, or five like a human. The robotic hand 1 including multiple finger members may be combined with the joints described in the second modification.

For example, three or five finger members 2 are discretely arranged in a circumferential direction about a vertical axis of the support 3 supporting their basal ends and can move toward or away from the axis by bending the joints of each finger member 2 with the drive 4.

(7-4) Fourth Modification

Figures 6A, 6B:
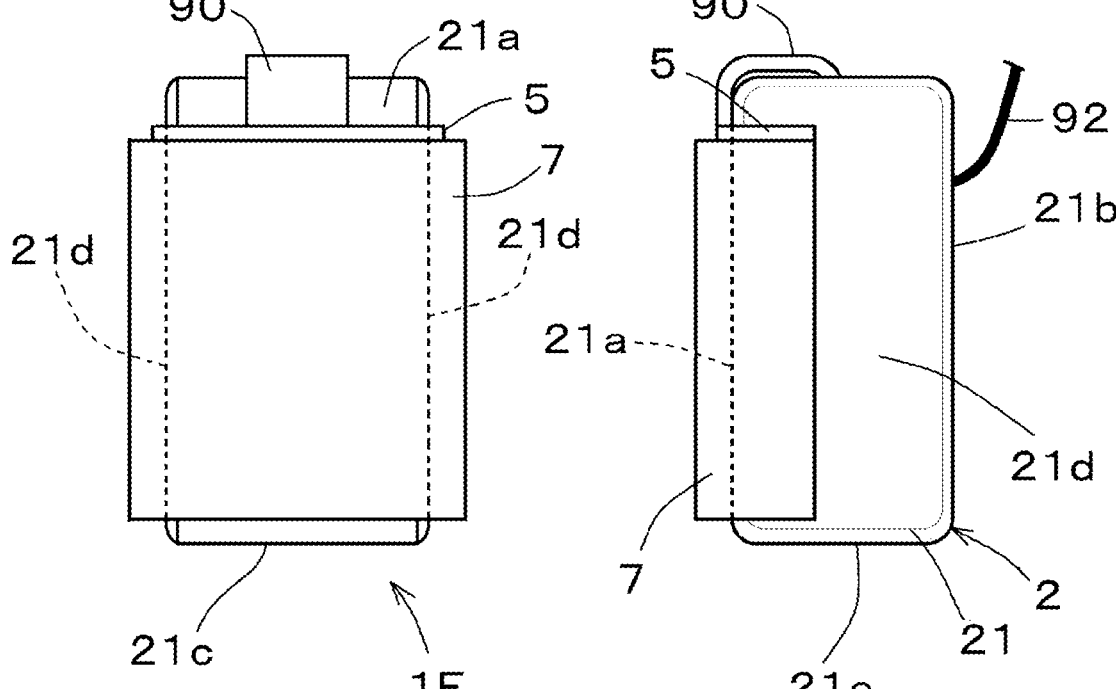
FIGS. 6A and 6B are diagrams of another example of the tactile sensor-attached finger according to the first embodiment.

In the first embodiment described above, the tactile sensor 5 includes the pressure-sensitive area 5a overlapping the palm surface 21a and the end surface 21c alone. However, the pressure-sensitive area 5a may have another structure. The pressure-sensitive area 5a may overlap the palm surface 21a and at least one of the end surface 21c, one of the two side surfaces 21d, or the other of the two side surfaces 21d. For example, as shown in FIGS. 6A and 6B, the tactile sensor 5 may include the pressure-sensitive area 5*a* over-lapping the palm surface 21*a* and the two side surfaces 21*d*. As shown in FIGS. 7A and 7B, the tactile sensor 5 may have the pressure-sensitive area 5*a* overlapping the palm surface 21*a*, the end surface 21*c*, and the two side surfaces 21*d*.

The tactile sensor 5 shown in FIGS. 7A and 7B is not rectangular in its development view. As shown in the development view in FIG. 8, the tactile sensor 5 in the present embodiment excludes portions to deviate from the outer surfaces of the housing 21 included in the finger member 2.

When the tactile sensor 5 is rectangular in its development view and includes portions indicated by the dashed lines in FIG. 8, the tactile sensor 5 includes, as shown in FIG. 9, portions deviating from the outer surfaces of the housing 21 on boundaries between the end surface 21*c* and the side surfaces 21*d* of the finger members 2. With the rigidity of the base films, these portions can prevent the film tactile sensor 5 from bending easily along the outer surfaces of the finger member 2. Further, these portions can easily form protrusions such as wrinkles on the outer surface of the tactile sensor 5, possibly causing insufficient tactile contact between the pressure-sensitive area 5*a* in the tactile sensor 5 and the grip target W.

As in the present embodiment, the film tactile sensor 5 excluding the excess portions deviating from the outer surfaces of the housing 21 and preventing bending can easily be bent along the outer surfaces of the finger member 2.

(7-5) Fifth Modification

In the first embodiment described above, the finger member 2 in the robotic hand 1 includes the substantially rectangular housing 21, but may have another structure. For example, at least one of the palm surface 21*a*, the end surface 21*c*, one of the two side surfaces 21*d*, or the other of the two side surfaces 21*d* of the finger member 2 may include multiple surfaces and overlap the pressure-sensitive area 5*a*.

FIGS. 10A to 10C are diagrams of an example tactile sensor 5 attached to the finger member 2 including multiple surfaces as the palm surface 21*a*. FIG. 10A is a diagram of the tactile sensor 5 as viewed from a position opposite to the finger member 2, showing its larger portion. FIG. 10B is a sectional view taken along line BB in FIG. 10A. FIG. 10C is a sectional view taken along line CC in FIG. 10A.

In the example shape shown in FIGS. 10A to 10C, the tactile sensor 5 is attached to the palm surface 21*a* of the finger member 2 that is not flat but is a three-dimensional surface including six surfaces. FIG. 11 shows a development view of the tactile sensor 5 shown in FIGS. 10A to 10C excluding portions to deviate from the outer surfaces of the housing 21 included in the finger member 2. The pressure-sensitive area 5*a* in the tactile sensor 5 is divided into areas (not shown) corresponding to the six surfaces based on the folded shape of the tactile sensor 5.

With the pressure-sensitive area 5*a* located on more surfaces, various states of contact with the grip target W can be measured.

Second Embodiment

A tactile sensor-attached robotic hand according to a second embodiment of the present invention will now be described with reference to FIGS. 13A and 13B. FIG. 13A is a diagram of a finger member 2 showing a palm surface 21*a*. FIG. 13B is a sectional view taken along line EE in FIG. 13A.

In the second embodiment, portions of the finger member 2 to which a tactile sensor 5 is unattached is covered with a protective layer 7, unlike in the first embodiment.

In other words, a protective area is enlarged to protect the finger member 2 in addition to the tactile sensor 5. The protective area may be enlarged to cover all or a part of portions of the finger member 2 to which the tactile sensor 5 is unattached.

The other components are the same as in the first embodiment and will not be described. Each modification described in the first embodiment is applicable to the second embodiment.

Third Embodiment

A tactile sensor-attached robotic hand according to a third embodiment of the present invention will now be described with reference to FIGS. 14A to 15B. FIG. 14A is a diagram of a finger member 2 showing a palm surface 21*a*, with a tactile sensor 5 alone protected by a protective layer 7. FIG. 14B is a sectional view taken along line FF in FIG. 14A. FIG. 15A is a diagram of the finger member 2 showing the palm surface 21*a*, with the finger member 2 protected by the protective layer 7. FIG. 15B is a sectional view taken along line GG in FIG. 15A.

In the third embodiment, spaces serving as cutouts 71 in the protective layer 7 are filled with cushion layers 8 that are softer than the protective layer 7, unlike in the first and second embodiments.

The spaces serving as the cutouts 71 filled with the cushion layers 8 that are softer than the protective layer 7 can reduce stress concentration on edges of the pressure-sensitive area 5*a* compared with the spaces not filled with the cushion layers 8. Repetitive stress concentration on the edges of the pressure-sensitive area 5*a* increases the likelihood of disconnection in the pressure-sensitive area 5*a*. This structure can minimize deterioration of durability of the tactile sensor 5 caused by the cutouts 71.

In the third embodiment, foam materials may be used as the soft material for the cushion layers 8. Examples of the foam materials include foamed rubber materials such as urethane and silicone.

The cushion layers 8 may be formed by, for example, mixing a foam material with liquid rubber before vulcanization and pouring the mixture into the cutouts 71 in the protective layer 7, or by pre-attaching the foam material to the pressure-insensitive area 5*b* in the tactile sensor 5 and then pouring a liquid to be the protective layer 7 before curing to cover the pressure-sensitive area 5*a* in the tactile sensor 5 and the foam material.

The other components are the same as in the first and second embodiments and will not be described. Each modification described in the first embodiment is applicable to the third embodiment.

Fourth Embodiment

An example shape of a protective layer in a tactile sensor-attached finger for a robotic hand according to a fourth embodiment of the present invention will now be described with reference to FIGS. 16A and 16B. FIG. 16A is a diagram of a finger member 2 showing a palm surface 21*a*, with the finger member 2 protected by a protective layer 7. FIG. 16B is a sectional view taken along line HH in FIG. 16A.

In the fourth embodiment, the entire surface of the tactile sensor 5 and parts (refer to FIGS. 16A and 16B) or all (not shown) of the two side surfaces 21d of the finger member 2 are continuously covered with the protective layer 7, unlike in the first embodiment. Additionally, the protective layer 7 includes a protrusion 72 protruding, in the thickness direction, more than portions of the protective layer 7 covering areas at or adjacent to the boundaries between the palm surface 21a and the two side surfaces 21d of the finger member 2 in a portion facing the palm surface 21a of the finger member 2 and covering the pressure-sensitive area 5a in the tactile sensor 5, unlike in the first embodiment. In the example shown in FIGS. 16A and 16B, the protective layer 7 includes the protrusion 72 extending also in a portion located on the end surface 21c of the finger member 2 and covering the pressure-sensitive area 5a in the tactile sensor 5.

Figure 17:
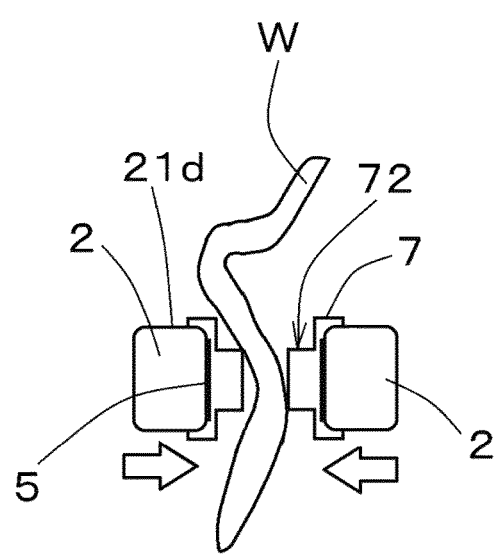
FIG. 17 is a diagram describing characteristics of the protective layer in the fourth embodiment.
Figure 18A:
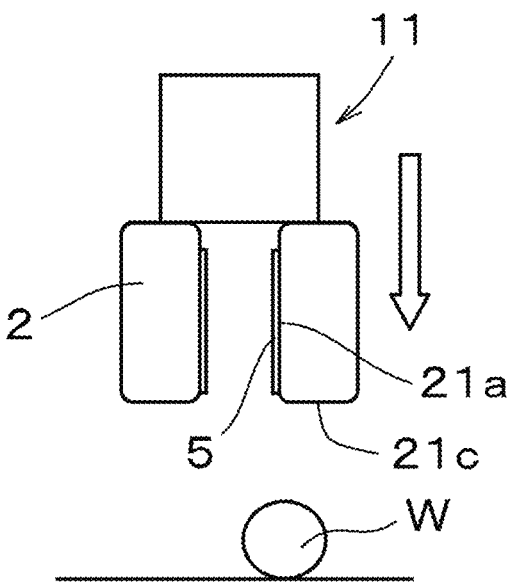
FIGS. 18A and 18B are diagrams showing an example use of a known robotic hand.
Figure 18B:
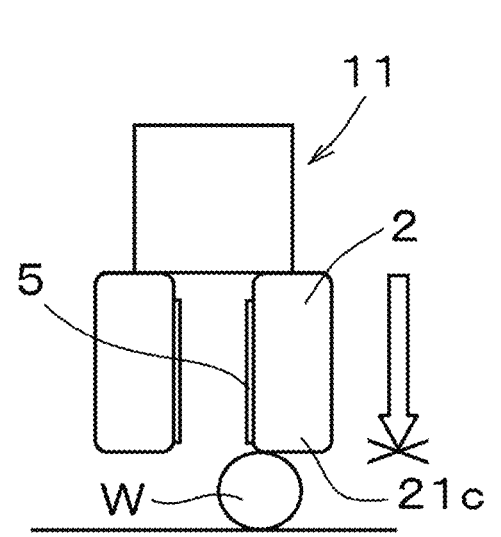
Figures 19A, 19B, 19C:
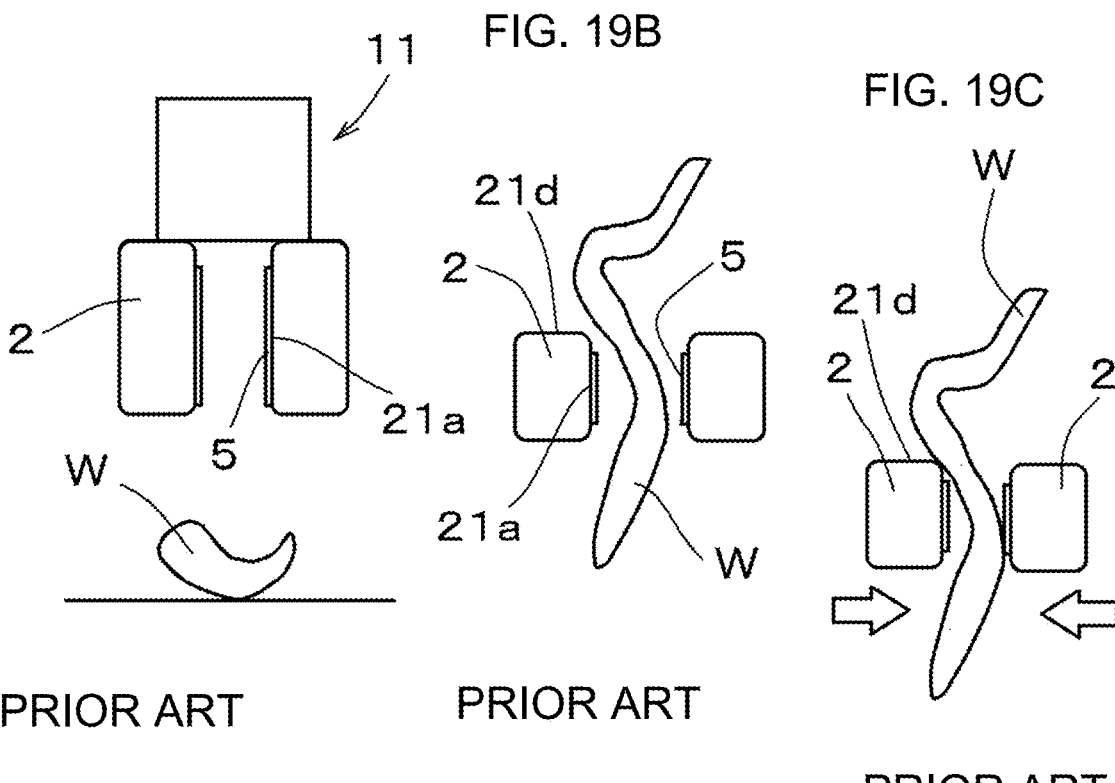
FIGS. 19A to 19C are diagrams showing another example use of the known robotic hand.

In the above structure, a protective area is enlarged to protect the finger member 2 in addition to the tactile sensor 5. Additionally, with the protective layer 7 protruding in the thickness direction in the portion facing the palm surface 21a of the finger member 2 and covering the pressure-sensitive area 5a in the tactile sensor 5, the protrusion 72 comes in contact with the grip target W before portions without the pressure-sensitive area 5a at or adjacent to the boundaries between the palm surface 21a and the side surfaces 21d of the finger member 2 comes in contact with the grip target W, allowing the pressure-sensitive area 5a including the protrusion 72 to detect the grip target W (refer to FIG. 17). Two finger members 2 thus do not further approach the grip target W from both sides, reducing unintended load applied between the robotic hand 11 and the grip target W.

The protrusion 72 may protrude, for example, to cause an imaginary plane (indicated by the two-dot-dash line in FIG. 16B) connecting an outer edge of a surface of the protective layer 7 parallel to the palm surface 21a of the finger member 2 and an outer edge of the top surface of the protrusion 72 to have an inclination angle θ of 30° or more with respect to the palm surface 21a, as shown in the sectional view in FIG. 16B taken along line HH in FIG. 16A. When the inclination angle θ is less than 30°, the protrusion 72 may not be sufficiently effective.

The protective layer 7 with the protrusion 72 is more easily formed than the protective layer 7 with the cutouts 71 in the portions on the tactile sensor 5 described above. The protective layer 7 with the above structure may be formed by, for example, insert molding. In other words, the protective layer 7 may be formed by placing the housing 21 with the tactile sensor 5 attached in a mold and pouring, for example, liquid rubber into the mold. The protective layer 7 may also be attached in the manner described in the first embodiment.

In the example shown in FIGS. 16A and 16B, the housing 21 included in the finger member 2 is exposed, but may be in another state in the fourth embodiment. For example, the housing 21 included in the finger member 2 may have a smaller or larger exposed area than in the structure shown in FIGS. 16A and 16B, or the finger member 2 may be fully covered with the protective layer 7.

The other components are the same as in the first embodiment and will not be described. Each modification described in the first embodiment is applicable to the fourth embodiment.

Although one or more embodiments of the present invention have been described, the present invention is not limited to the embodiments, and may be changed in various manners without departing from the spirit and scope of the present invention. The embodiments and modifications described herein can be combined in any manner as appropriate.

REFERENCE SIGNS LIST 1, 11 robotic hand
1F tactile sensor-attached finger
2 finger member
21 housing
21a palm surface
21b back surface
21c end surface
21d side surface
3 support
4 drive
5 tactile sensor
5a pressure-sensitive area
5b pressure-insensitive area
51 first base film
52 first electrode
53 first electrode film
54 second base film
55 second electrode
56 second electrode film
57 insulator
6 adhesive layer
7 protective layer
71 cutout
72 protrusion
8 cushion layer
90 film connector
91 PCB
92 cable
100 robot
110 support base
120 arm
130 first arm
140 second arm
150 work head

The invention claimed is:

1. A tactile sensor-attached finger for a robotic hand for gripping a grip target, the finger comprising:
   a finger member including
      a palm surface to be in contact with the grip target,
      a back surface opposite to the palm surface,
      an end surface adjacent to the palm surface and the back surface on ends of the palm surface and the back surface in an extension direction in which the palm surface and the back surface extend, and
      first and second side surfaces adjacent to the palm surface and the back surface in a direction intersecting with the extension direction of the palm surface and the back surface;
   a tactile sensor being a film attached to an outer surface of a housing included in the finger member, the tactile sensor including a pressure-sensitive area overlapping the palm surface and at least one of the end surface, the first side surface, and the second side surface; and
   a protective layer covering the tactile sensor.

2. The tactile sensor-attached finger according to claim 1, wherein
   the tactile sensor includes the pressure-sensitive area overlapping the palm surface and the end surface.

3. The tactile sensor-attached finger according to claim 1, wherein the tactile sensor includes the pressure-sensitive area overlapping the palm surface and the first and second side surfaces.

4. The tactile sensor-attached finger according to claim 1, wherein the tactile sensor is a capacitive pressure-sensitive sensor including a first electrode film including a first base film with a first electrode on the first base film, a second electrode film including a second base film facing the first base film with a second electrode on the second base film, and an insulator between the first electrode film and the second electrode film, and the tactile sensor is attached to the finger member with the first base film facing the finger member.

5. The tactile sensor-attached finger according to claim 4, wherein the first base film and the second base film have a relationship expressed as $E_1 \times t_1 > E_2 \times t_2$, where $E_1$ is a tensile elastic modulus of the first base film, $E_2$ is a tensile elastic modulus of the second base film, $t_1$ is a thickness of the first base film, and $t_2$ is a thickness of the second base film.

6. The tactile sensor-attached finger according to claim 1, wherein at least one of the palm surface, the end surface, the first side surface, or the second side surface of the finger member includes a plurality of surfaces and overlaps the pressure-sensitive area.

7. The tactile sensor-attached finger according to claim 1, wherein the tactile sensor excludes a portion to deviate from the outer surface of the housing included in the finger member.

8. The tactile sensor-attached finger according to claim 1, wherein the pressure-sensitive area in the tactile sensor is divided into a plurality of areas based on a folded shape of the tactile sensor.

9. The tactile sensor-attached finger according to claim 1, wherein the protective layer partially or fully covers a portion of the finger member to which the tactile sensor is unattached.

10. The tactile sensor-attached finger according to claim 1, wherein the protective layer at least partially covers a surface of the tactile sensor and a part or all of the first and second side surfaces of the finger member.

11. A robotic hand, comprising:

a plurality of the tactile sensor-attached fingers according to claim 1;

a support supporting basal ends of a plurality of finger members in the plurality of tactile sensor-attached fingers; and a drive configured to drive the finger members to grip or release the grip target.

12. The robotic hand according to claim 11, wherein the plurality of finger members are two finger members, the two finger members include palm surfaces facing each other, and each of the two finger members includes no joint, and the palm surfaces being parallel to each other move closer to each other to grip the grip target.

13. A tactile sensor-attached finger for a robotic hand configured to grip a grip target, the finger comprising:

a finger member including a palm surface to be in contact with the grip target, a back surface opposite to the palm surface, an end surface adjacent to the palm surface and the back surface on ends of the palm surface and the back surface in an extension direction in which the palm surface and the back surface extend, and a first side surface and a second side surface adjacent to the palm surface and the back surface in a direction intersecting with the extension direction of the palm surface and the back surface;

a tactile sensor being a film attached to an outer surface of a housing included in the finger member, the tactile sensor including a pressure-sensitive area overlapping the palm surface, at least one of the end surface, the first side surface, and the second side surface; and a protective layer continuously covering a full surface of the tactile sensor and a part or all of the first and second side surfaces of the finger member, the protective layer including a protrusion facing the palm surface of the finger member and covering the pressure-sensitive area in the tactile sensor, the protrusion protruding in a thickness direction more than a portion of the protective layer covering areas at or adjacent to boundaries between the palm surface and the first and second side surfaces of the finger member.

14. The tactile sensor-attached finger according to claim 13, the tactile sensor is a capacitive pressure-sensitive sensor including a first electrode film including a first base film with a first electrode on the first base film, a second electrode film including a second base film facing the first base film with a second electrode on the second base film, and an insulator between the first electrode film and the second electrode film, and the tactile sensor is attached to the finger member with the first base film facing the finger member.

15. The tactile sensor-attached finger according to claim 14, wherein the first base film and the second base film have a relationship expressed as $E_1 \times t_1 > E_2 \times t_2$, where $E_1$ is a tensile elastic modulus of the first base film, $E_2$ is a tensile elastic modulus of the second base film, $t_1$ is a thickness of the first base film, and $t_2$ is a thickness of the second base film.

16. The tactile sensor-attached finger according to claim 13, wherein the pressure-sensitive area in the tactile sensor is divided into a plurality of areas based on a folded shape of the tactile sensor.

17. A tactile sensor-attached finger for a robotic hand for gripping a grip target, the finger comprising:

a finger member including a palm surface to be in contact with the grip target, a back surface opposite to the palm surface, an end surface adjacent to the palm surface and the back surface on ends of the palm surface and the back surface in an extension direction in which the palm surface and the back surface extend, and a first side surface and a second side surface adjacent to the palm surface and the back surface in a direction intersecting with the extension direction of the palm surface and the back surface;

a tactile sensor being a film attached to an outer surface of a housing included in the finger member, the tactile sensor including a pressure-sensitive area overlapping the palm surface and at least one of the end surface, the first side surface, and the second side surface, wherein the tactile sensor is a capacitive pressure-sensitive sensor including a first electrode film including a first base film with a first electrode on the first base film, a second electrode film including a second base film facing the first base film with a second electrode on the second base film, the tactile sensor is attached to the finger member with the first base film facing the finger member.

18. The tactile sensor-attached finger according to claim 17, further comprising an insulator between the first electrode film and the second electrode film.

* * * * *